(12) United States Patent
Williamson et al.

(10) Patent No.: US 10,376,932 B2
(45) Date of Patent: Aug. 13, 2019

(54) METHODS OF MANUFACTURING AND CLEANING

(71) Applicant: ROLLS-ROYCE plc, London (GB)

(72) Inventors: Peter Williamson, Darlington (GB); Richard Hawley, Carlisle (GB); David Neely, Newbury (GB)

(73) Assignee: ROLLS-ROYCE plc, London (GB)

( * ) Notice: Subject to any disclaimer, the term of this patent is extended or adjusted under 35 U.S.C. 154(b) by 2 days.

(21) Appl. No.: 15/014,076

(22) Filed: Feb. 3, 2016

(65) Prior Publication Data

US 2016/0228929 A1 Aug. 11, 2016

(30) Foreign Application Priority Data

Feb. 9, 2015 (GB) .................................. 1502086.0

(51) Int. Cl.
*B08B 7/02* (2006.01)
*B23K 26/342* (2014.01)
(Continued)

(52) U.S. Cl.
CPC .............. *B08B 7/02* (2013.01); *B22F 3/1055* (2013.01); *B23K 15/0086* (2013.01);
(Continued)

(58) Field of Classification Search
CPC ....... B08B 7/02; B23K 26/342; B22F 3/1055; B22F 3/02; B22F 3/10; B22F 1/0003;
(Continued)

(56) References Cited

U.S. PATENT DOCUMENTS 5,464,479 A * 11/1995 Kenton ................. B08B 3/04
134/1
5,490,882 A * 2/1996 Sachs ................. B08B 3/10
134/1
(Continued)

FOREIGN PATENT DOCUMENTS

EP 2 762 252 A1 8/2014
WO 94/12284 A1 6/1994

OTHER PUBLICATIONS

Jun. 25, 2015 Search Report issued in British Patent Application No. 1502086.0.
(Continued)

*Primary Examiner* — Binh X Tran
*Assistant Examiner* — Christopher Remavege
(74) *Attorney, Agent, or Firm* — Oliff PLC

(57) ABSTRACT

Methods of cleaning internal portions of additively manufactured components are provided, together with an apparatus for carrying out the cleaning. The methods use an impacting element which is contained within the internal portion and the component is vibrated to clean material from the component and leave one or more hollow portions. Various embodiments for retaining the impacting element are set out, which preferably use a grid which allows loosened powder to fall out of the component and, optionally, be recycled for use in further manufacturing processes. The methods are described in relation to components for gas turbine engines but have wider application in relation to any additively manufactured component in which it is desired to have a hollow internal portion.

13 Claims, 4 Drawing Sheets

(51) Int. Cl.

| | |
|---|---|
| *B22F 3/105* | (2006.01) |
| *B23K 15/00* | (2006.01) |
| *F01D 9/02* | (2006.01) |
| *F01D 25/08* | (2006.01) |
| *F01D 25/24* | (2006.01) |
| *B29C 64/35* | (2017.01) |
| *B33Y 10/00* | (2015.01) |
| *B33Y 40/00* | (2015.01) |

(52) U.S. Cl.
CPC ............ *B23K 26/342* (2015.10); *B29C 64/35* (2017.08); *F01D 9/02* (2013.01); *F01D 25/08* (2013.01); *F01D 25/24* (2013.01); *B33Y 10/00* (2014.12); *B33Y 40/00* (2014.12); *F05D 2220/32* (2013.01); *F05D 2230/10* (2013.01); *F05D 2230/22* (2013.01)

(58) Field of Classification Search
CPC .... B22F 1/025; B22F 2007/042; B22F 3/004; B22F 5/00; B22F 7/04; B29C 67/0096; F01D 9/02; F01D 25/24; B33Y 10/00; B33Y 40/00
USPC ......... 134/6; 164/48, 80, 494; 264/401, 482, 264/497
See application file for complete search history.

(56) References Cited

U.S. PATENT DOCUMENTS

| | | | | |
|---|---|---|---|---|
| 6,036,777 | A * | 3/2000 | Sachs | ...................... B05C 19/04 118/120 |
| 6,830,643 | B1 * | 12/2004 | Hayes | ................... B41M 3/006 118/308 |
| 2006/0118532 | A1* | 6/2006 | Chung | .................. B22F 3/1028 219/121.85 |
| 2007/0098929 | A1 | 5/2007 | Dietrich et al. | |
| 2012/0107496 | A1* | 5/2012 | Thoma | ................ B29C 67/0077 427/202 |
| 2013/0112366 | A1* | 5/2013 | Mottin | ...................... B22F 5/04 164/494 |
| 2015/0336233 | A1* | 11/2015 | Twelves | ................ B24B 31/006 451/32 |
| 2016/0074940 | A1* | 3/2016 | Cote | ........................ B22F 3/24 134/23 |
| 2017/0144382 | A1* | 5/2017 | Ott | ...................... B29C 67/0096 |
| 2017/0197284 | A1* | 7/2017 | Twelves, Jr. | ............ B23P 15/02 |

OTHER PUBLICATIONS

Jun. 10, 2016 Search Report issued in European Patent Application No. 16153804.

* cited by examiner

METHODS OF MANUFACTURING AND CLEANING

FIELD OF THE INVENTION

The present invention relates to methods of cleaning internal portions of additively manufactured components and methods of manufacturing such components. It is particularly, but not exclusively, concerned with methods in which an impacting medium is contained within the internal portions and the component vibrated to clean material from the component and leave one or more hollow portions.

BACKGROUND OF THE INVENTION

Additive manufacturing is still an emerging process in the aerospace industry and suffers from a particular disadvantage in that there are limited known techniques of removing the excess powder from internal cavities.

In other applications vibration finishing or peening are used. Both of these concepts use surrounding media to impact the surfaces of components to smooth or clean the surfaces. These concepts are usually used on external surfaces for solid components, for example on turbine blades following investment casting manufacture.

However, for cleaning and smoothing internal cavities and channels, the processes are more complex. A high pressure air blasting technique (using titanium powder as the abrasive agent) is used to remove the solid powder as far into the channel as possible (approximately 30-50 mm). A titanium tool is then used to manually chisel the remainder of the powder out.

Vibro-finishing involves submerging the entire powder encased component in a vibrating media, for example ball bearings or ceramic pebbles. One of the factors affecting the rate of abrasion/cleaning is the surface area available to contact the media. Certain internal channels and cavities will have a small aperture with respect to the size of the external surface area of the component in which they are formed therefore access into the channel will be limited. The erosion rate of the powder in the channel with respect to the erosion of the external surfaces will be very slow. As a result of the slow erosion rate, significant periods of time would be needed to clear the entire channel or cavity by this method. Sharp or sensitive features on the external surfaces would become rounded off and damaged if this technique was applied for long periods of time.

The current blasting and chiselling technique is also quite slow. It can take of the order of 20-30 minutes to clear a single channel or cavity in a component, and longer for larger channels or cavities. As the process has to be repeated for each channel or cavity in the component, this can add up significantly. Also, some powder remains on the walls of the channel and there is difficulty in clearing bends as a direct line of sight is required for the tool.

The manual dependency of the process results in expensive labour costs which could be avoided with a more automated solution.

The present invention aims to ameliorate or solve one or more of the above problems.

SUMMARY OF THE INVENTION

At their broadest, methods of aspects of the invention provide methods of cleaning an additively manufactured component and manufacturing such a component which clean an internal portion of the component using a retained impacting element.

A first aspect of the present invention provides a method of cleaning an internal portion of an additively manufactured component, the method including the steps of: retaining an impacting element within the internal portion; vibrating the component so as to cause the impacting element to repeatedly impact on the powder of the internal portion and loosen it from the surrounding portions of the component; and removing the loosened powder from the internal portion to leave a hollow portion within the component.

Using an impacting element enables powder from hard to access internal channels or other internal portions to be removed by an automated or partially automated method.

The method may be used with any form of additive manufacturing process, such as electron beam melting (EBM), selective beam melting (SBM), direct metal deposition/selective laser sintering (SLS) or any other.

Optional features of the invention will now be set out. These are applicable singly or in any combination with any aspect of the invention.

Preferably the internal portion is formed in the manufacturing process with a powder that is less securely bound than the surrounding portions of the component. For example, if the component is formed by EBM, the powder in the internal portion may be partially sintered whilst the main body of the component is fused.

In its simplest form, the internal portion may comprise a single channel with exit and entry through holes along a single plane. In more complex components, the internal portion might comprise multiple holes or cavities, optionally interconnecting along multiple planes.

The impacting element preferably repetitively scavenges out the powder from the internal portion over time. For example the internal portion may contain partially sintered powder which is loosened by each impact of the impacting element on the powder.

The method preferably acts to remove the powder from the internal portion in small increments. This means that the powder falls out with its original morphology and grain size.

The size and shape of the impacting element can be selected based on the size and shape of the internal portion which is to be cleaned. A wide number of shapes for the impacting element are possible; however, shapes with rotational symmetry in at least one plane are advantageous since they encourage rolling rather than sliding due to friction when the element is agitated by external vibrations. Desirably, the impacting element will have rotational symmetry with an order of 5 or more. For example, substantially or wholly disc or ball-shaped elements can be used for cleaning channels within the component.

Preferably the impacting element is made from the same material as the component. Manufacturing the impacting element from the same material as the host component prevents cross contamination and damage due to wear. This enables the powder to be directly recycled back into the hopper of the additive manufacturing machine reducing waste and cost.

In certain embodiments, the internal portion has an opening in a surface of the component and the step of retaining includes providing a retaining member across said opening such that the retaining member allows loosened powder to exit the component, but retains the impacting element within the internal portion.

The retaining member may be, for example, a grid or bar, or series of bars. The retaining member enables the powder to fall out of the internal portion preventing damping of the motion of the impacting element, but retains good transfer of momentum from the component to the impacting element. This can decrease the total length of time required for the impacting element to clean the entire internal portion as successive impacts are not dampened by the powder from previous impacts.

In other embodiments, the step of vibrating the component uses a vibration rig and the retaining member and impacting element are provided as part of said vibration rig and the component is attached to the rig such that the retaining member and impacting element are placed over said opening.

In these embodiments, as the retaining member and the impacting element are provided as part of the vibration rig, they can start to clear the internal portion from the opening and work inwards into the component.

For more complex internal portions, the rig can be configured for vibration along multiple planes to encourage travel of the impacting element along non-parallel cavity axes.

In a particularly preferred embodiment, the impacting element is formed within the internal portion during said additive manufacturing. For example, the impacting element may be sintered from the powder of the surrounding internal portion during the additive manufacturing process and is therefore formed of the same material as the component, and automatically contained within the component (there is no need for an opening to be cleared for the impacting element to be inserted), preferably by a retaining element formed by the additive manufacturing process as well.

Preferably the internal portion has an opening, or an area where an opening will be in the finished component, in a surface of the component and a retaining member is formed across said opening in the additive manufacturing.

In certain embodiments the retaining member includes a dropout which is removable from the retaining member and provides a passage for the loosened powder to exit the internal portion.

Providing the impacting element and the retaining member during the additive manufacturing process makes it possible to have a highly automated cleaning process, and therefore simple to integrate the cleaning process within an overall automated manufacturing process for the component.

The method of this aspect is readily adaptable for almost any hollow additively manufactured component. In certain embodiments the component is a component of a gas turbine engine.

This process can be utilised in the manufacture of many aerospace components by EBM. Without limitation, this can include engine structures such as engine section stators, heat exchangers, ducts and housings manufactured for use in gas turbine engines. Using a disc-shaped impacting element, and containing the disc inside the internal channels and applying high amplitude vibration enables effective automated clearing of the internal channels and cavities of these components.

In most instances the excess powder must be removed from the external and internal surfaces following manufacture. The impacting disc method may enable future additive manufacture of hollow components such as fuel injector nozzles, valves, pipework etc. By altering the geometry of the impacting element to one or more ball-shaped elements or other solid shapes, the process could be amended to clear different channels or internal profiles. The retaining element could also be adjusted to suit the size and shape of the impact element and the channel aperture.

A second aspect of the present invention provides a method of manufacturing a component having an internal portion which is intended to be hollow in the finished component, the method including the steps of: forming the component by an additive manufacturing process, including forming one or more surfaces defining the internal portion; and cleaning the internal portion using a method according to the above described first aspect, including some, all or none of the above described preferred and optional features of that aspect.

Preferably the step of forming includes forming the impacting element within the internal portion. This makes it possible to have a highly automated manufacturing process for the component and the impacting element is automatically formed from the same material as the component, with the advantages previously discussed.

Preferably the method includes the further step of recycling the loosened powder for future manufacturing.

A third aspect of the present invention provides an apparatus for cleaning an internal portion of an additively manufactured component, the apparatus including: an impacting element; a retaining element for retaining the impacting element within said internal portion: and a vibration rig to which the component can be connected and for vibrating the component such that the impacting element repeatedly impacts on the powder of the internal portion to loosen it from the surrounding portions of the component.

In certain embodiments, the impacting element and the retaining element form part of the vibration rig and are arranged to be attached to the component when the component is fitted to the vibration source.

The apparatus of this aspect is preferably used in carrying out a method according to the above described first or second aspect, but need not be.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
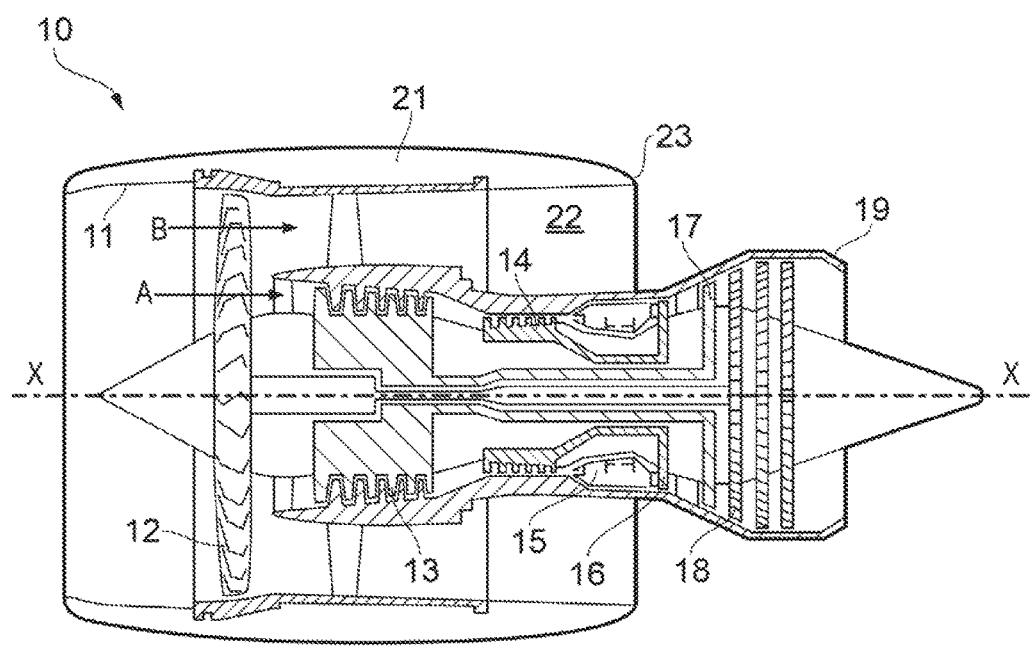
FIG. 1 shows a ducted fan gas turbine engine in the manufacture of which embodiments of the invention are applied.

With reference to FIG. 1, a ducted fan gas turbine engine in the manufacture of which the embodiments of the present invention are applied is generally indicated at 10 and has a principal and rotational axis X-X. The engine comprises, in axial flow series, an air intake 11, a propulsive fan 12, an intermediate pressure compressor 13, a high-pressure compressor 14, combustion equipment 15, a high-pressure turbine 16, an intermediate pressure turbine 17, a low-pressure turbine 18 and a core engine exhaust nozzle 19. A nacelle 21 generally surrounds the engine 10 and defines the intake 11, a bypass duct 22 and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the air flow A directed into it before delivering that air to the high pressure compressor 14 where further compression takes place.

The compressed air exhausted from the high-pressure compressor 14 is directed into the combustion equipment 15 where it is mixed with fuel and the mixture combusted. The resultant hot combustion products then expand through, and thereby drive the high, intermediate and low-pressure turbines 16, 17, 18 before being exhausted through the nozzle 19 to provide additional propulsive thrust. The high, intermediate and low-pressure turbines respectively drive the high and intermediate pressure compressors 14, 13 and the fan 12 by suitable interconnecting shafts.

In embodiments of the present invention, impacting elements are used to clean the internal channels of additively manufactured components of an aerospace engine, such as the gas turbine engine described above. Without limitation, this can include engine structures such as engine section stators, heat exchangers, ducts and housings manufactured for use in gas turbine engines. By way of example (though not essential to the practicing of the invention), the impacting elements are shown as discs.

In the illustrated embodiment, the impacting discs are circular to enable rolling against the edges of the channel. The smooth perimeter reduces friction, enabling the disc to travel further up the channel with minimum wear to the surrounding component or the disc itself. To enable powder recycling back into the additive manufacturing machine, the powder should maintain its original morphology and chemical composition so cross-contamination should be avoided. To further reduce this risk, the impacting disc can be manufactured from the same material as the host part. Multiple discs can be inserted into both ends of the channel to improve penetration into the centre of the component and reduce the time taken for cleaning.

Figure 2:
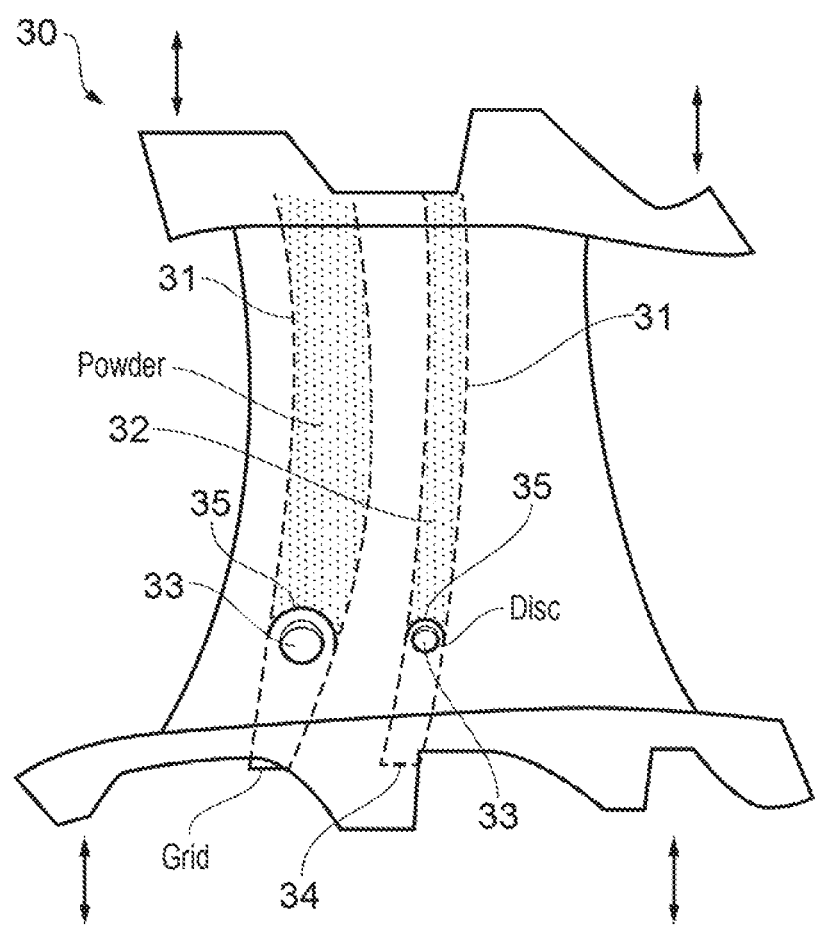
FIG. 2 shows the general principles behind embodiments of the present invention when applied to ESS channels.

The general arrangement of the cleaning process in embodiments of the present invention is illustrated schematically in FIG. 2. Channels 31 are formed in the component 30 and are shown partly filled with powder 32. Discs 33 are contained within the channels by containment grids 34. Vibration of the component 30 in the direction indicated by the arrows causes the discs 33 to oscillate within the channel and repeatedly impact on the exposed face 35 of the powder 32. Powder which is loosened by the impact of the discs 33 exits the channels 31 through the grids 34 and can be recycled.

Figure 3:
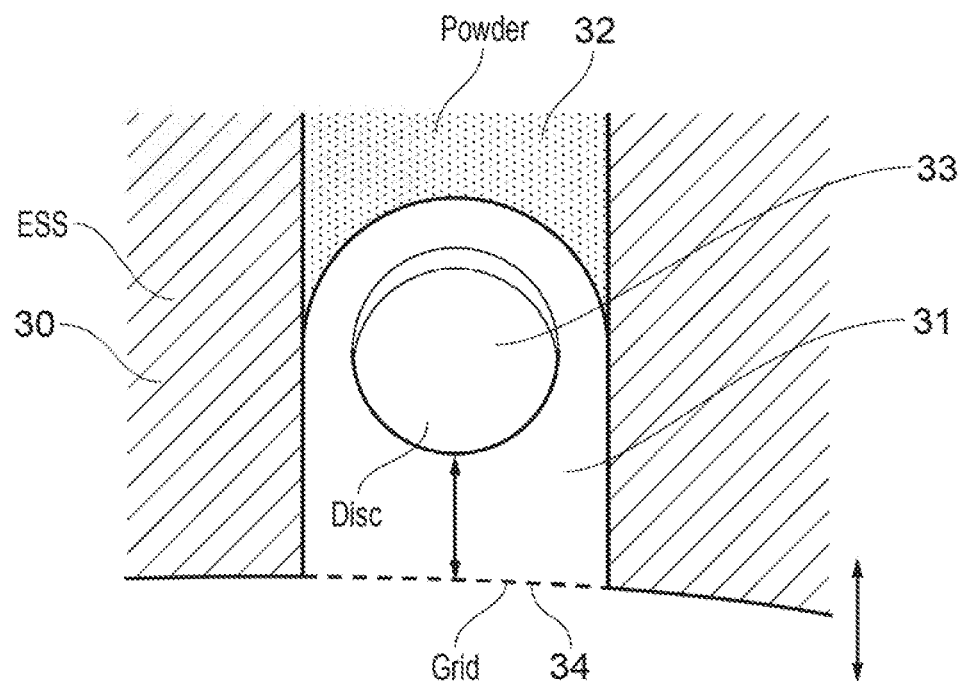
FIG. 3 shows the configuration of a channel and impacting media used in a method according to a first embodiment of the present invention.

In a method according to a first embodiment of the present invention, the disc(s) 33 are inserted into the channels 31 and contained therein using containment grids 34 which are fixed on the inner/outer annulus faces of the component 30 so as to cover the exits from the channels 31. This method is illustrated schematically in FIG. 3.

To insert the disc into the channel 31, a depth equal to that of the diameter of the disc must first be cleared out, for example using traditional air blasting techniques (or chiselling with the titanium rod). The disc 33 can then be inserted into the channel 31 and contained using a grid/bar 34 that fastens onto the component 30 at one end of the channel 31. This grid/bar contains the disc 33 within the channel 31 allowing loosened powder to fall out of the channel by gravity. The powder 32 is loosened by vibrating the component 30, causing the disc 33 to repeatedly impact on the powder as described in more detail below. This process requires a degree of manual set up to clear the first portion of the channel 31, insert the disc 33 and attach the grid 34.

Figure 4:
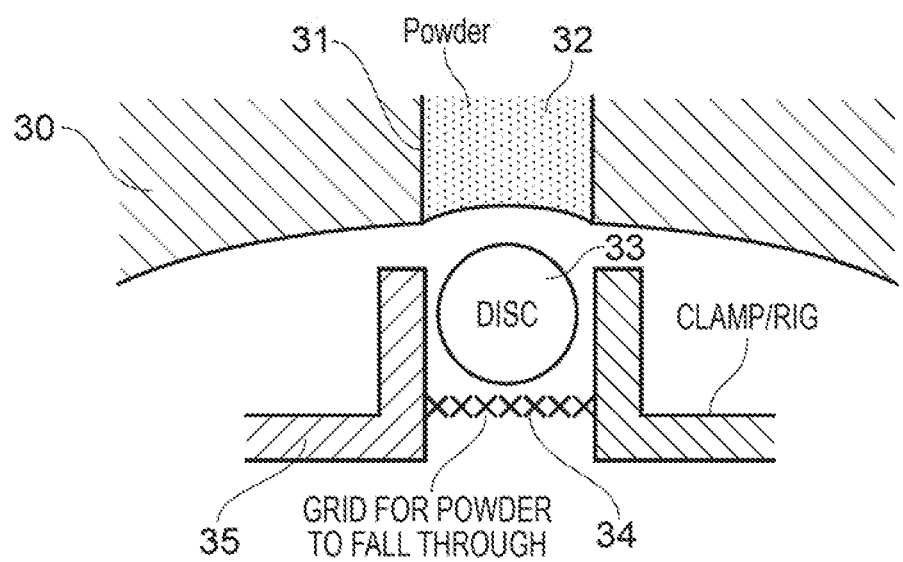
FIG. 4 shows the configuration of a channel and impacting media used in a method according to a second embodiment of the present invention.

In a method according to a second embodiment of the present invention, the disc(s) 33 are provided to and retained in the channels 31 by a containment extension 35 which is attached onto the end of the channel 31 when the component 30 is placed on a vibrating shaker or other vibration source. This method is illustrated in FIG. 4.

The method using the containment extension 35 is an adaptation of the method of the first embodiment discussed above. This method has the benefit that the initial depth of powder 32 does not need to be removed from the channel 31, which makes the clearing process more automated and can provide for faster turnaround times. However, some manual set-up is still required. Further, by adding the extension bracket, higher frequency amplitudes may be required to enable the disc to travel the additional distance.

In a method according to a third embodiment of the present invention, the discs 33 (or alternative impacting media) and the containment feature are sintered into the component during manufacturing. This method provides for a more automated approach to the cleaning.

Figure 5:
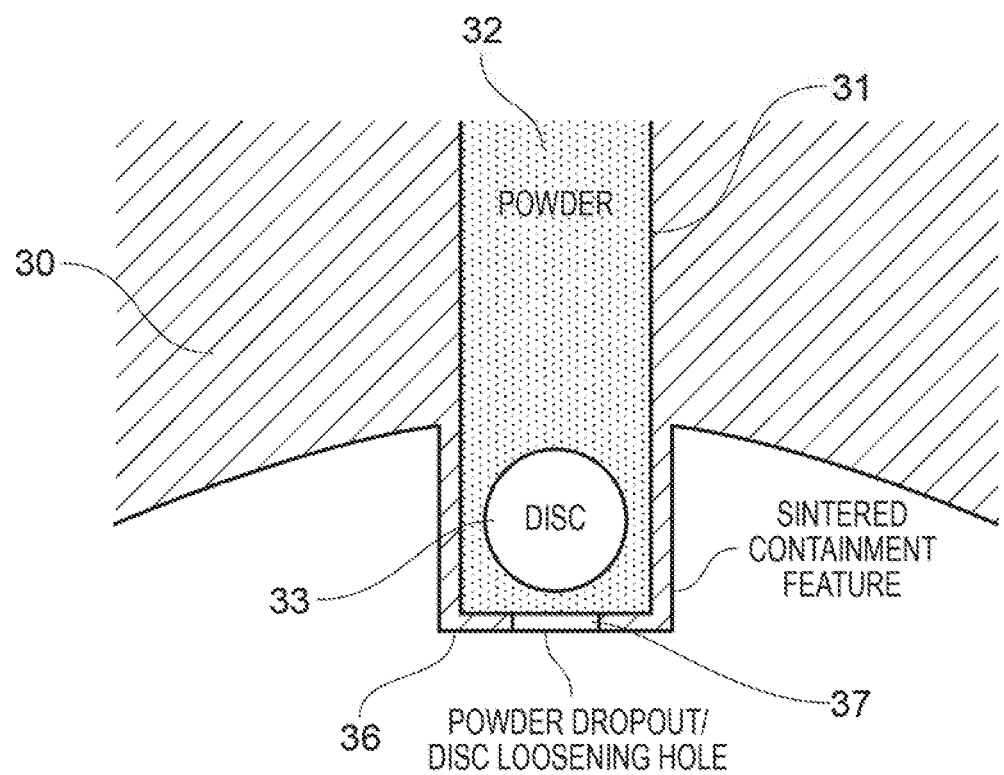
FIG. 5 shows the configuration of a channel and impacting media used in a method according to a third embodiment of the present invention.

To improve the automation of the clearing process, in the method according to the third embodiment, as illustrated in FIG. 5, the impacting media (e.g. discs 33, balls, pellets etc.) and the containment feature 36 are sintered in during the manufacture of the hollow component 30. The impacting media 33 is loosened prior to, or as part of, starting the shaking process to enable the media to gather momentum within the channel 31 and start the clearing process. For example a dropout 37 may be provided in the containment feature 36 which is formed of looser powder (e.g. similar to the powder formed in the cavity or channel 31). This dropout 37 may be shaken free at the start of the cleaning process. Alternatively, if sufficient energy is imparted to the component by the shaking process, the media 33 may, by virtue of being more solidly formed than the surrounding material, shake itself free to start its motion. The containment feature 36 can be removed along with the manufacturing support structures following the clearing process.

In the methods of all of the above embodiments, once the discs 33 are contained in the channels, the component 30 will be attached onto a vibration rig or other machine that is a source of vibration. The component 30 will be vibrated in the orientation of the axis of the channel. This will cause the disc or other impacting media 33 to travel back and forth along this path. Transfer of momentum to the media 33 propels it towards the powder 32 with high kinetic energy. The media will impact the powder 32 on its exposed edge causing high local pressure on the powder causing it to break up and fall out of the component under gravity (bottom aperture) or by the motion of vibration (top aperture). This continuous removal of the powder out of the channel prevents dampening of the motion of the disc 33 as the cleaning progresses.

The disc 33 will continue to scavenge out the remaining powder 32 as time progresses as long as there is sufficient amplitude and energy input into the system. Optimisation of this process can be achieved by the use of a closed loop feedback system. This system controls the input frequency and amplitude by matching it to the depth of the powder cleared.

Upon completion of the clearing process, the containment feature 34 and the disc 33 will be removed from the component 30.

Whilst the present embodiments have been described in relation to the cleaning of channels of a component of an aerospace engine, it will be readily appreciated that this technology could be applied to almost any hollow additively manufactured component as the process can be readily optimised for the specific application. In particular, the media shape, size, number and location could be optimised for the geometry of the internal cavity and the volume/timescales required for cleaning the part.

As well as the aerospace engine application described in the above embodiments, other examples include hollow titanium joint replacements, engine/nuclear power plant valves and nozzles etc.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A method of cleaning an internal portion of an additively manufactured component, the internal portion containing an impacting element, the method comprising:
   vibrating the component so as to transfer momentum to the impacting element in order to cause the impacting element to repeatedly impact on powder of the internal portion and loosen the powder from the surrounding portions of the component;
   removing the loosened powder from the internal portion to leave a hollow portion within the component,
   wherein the internal portion has an opening in a surface of the component;
   providing a retaining member across the opening; and
   retaining, by the retaining member, the impacting element within the internal portion,
   wherein the retaining member is provided across the opening such that the retaining member allows the loosened powder to exit the component, but retains the impacting element within the internal portion.

2. The method according to claim 1, wherein the internal portion is formed in the manufacturing process with a powder that is less securely bound than the surrounding portions of the component.

3. The method according to claim 1, wherein the impacting element has rotational symmetry in at least one plane.

4. The method as claimed in claim 3, wherein the impacting element is substantially disc-shaped or ball shaped.

5. The method according to claim 1, wherein the impacting element is made from the same material as the component.

6. The method according to claim 1, wherein
   vibrating the component includes using a vibration rig,
   the retaining member and impacting element are provided as part of the vibration rig, and
   the component is attached to the vibration rig such that the retaining member and impacting element are placed over the opening.

7. The method according to claim 1, wherein the impacting element is formed within the internal portion during the additive manufacturing.

8. The method according to claim 7, wherein the retaining member is formed across the opening in the additive manufacturing of the component.

9. The method according to claim 8, wherein the opening includes a dropout which is removable from the opening and provides a passage for the loosened powder to exit the internal portion.

10. The method according to claim 1, wherein the component is a component of a gas turbine engine.

11. A method of manufacturing a component having an internal portion which is intended to be hollow in the finished component, the method comprising:
    forming the component by an additive manufacturing process, including forming one or more surfaces defining the internal portion; and
    cleaning the internal portion using the method of claim 1.

12. The method according to claim 11, further comprising:
    forming the impacting element within the internal portion.

13. The method according to claim 11 further comprising:
    recycling the loosened powder for future manufacturing.

* * * * *